(12) United States Patent
Czaja et al.

(10) Patent No.: US 8,612,181 B2
(45) Date of Patent: Dec. 17, 2013

(54) WIRELESS SYSTEM FOR MONITORING AND ANALYSIS OF SKIING

(75) Inventors: Stanislaw Czaja, Cardiff, CA (US); Andrzej Bachleda-Curus, Zakopne (PL); Tadeusz Nanowski, Gliwice (PL); Ilona Stawski, Avon Lake, OH (US); Marty Czaja, Oceanside, CA (US)

(73) Assignee: IPComm, Cardiff, CA (US)

( * ) Notice: Subject to any disclaimer, the term of this patent is extended or adjusted under 35 U.S.C. 154(b) by 368 days.

(21) Appl. No.: 13/024,070

(22) Filed: Feb. 9, 2011

(65) Prior Publication Data

US 2011/0131012 A1  Jun. 2, 2011

Related U.S. Application Data

(60) Provisional application No. 61/310,584, filed on Mar. 4, 2010.

(51) Int. Cl.
G06F 19/00 (2011.01)

(52) U.S. Cl.
USPC ............. 702/188; 702/44; 702/141; 702/142; 702/149; 702/160; 702/182; 422/63; 422/72; 422/101; 436/43

(58) Field of Classification Search
USPC ............. 702/141, 182, 188, 142, 150, 94, 44, 702/19, 72, 160, 149; 422/566, 504, 400, 422/506, 81, 72, 502, 68.1, 63, 101; 324/214; 436/177, 180, 50, 43
See application file for complete search history.

(56) References Cited

U.S. PATENT DOCUMENTS

| | | | | |
|---|---|---|---|---|
| 5,524,637 A * | 6/1996 | Erickson | | 600/592 |
| 5,862,803 A * | 1/1999 | Besson et al. | | 600/508 |
| 6,498,994 B2 * | 12/2002 | Vock et al. | | 702/44 |
| 6,885,971 B2 * | 4/2005 | Vock et al. | | 702/182 |
| 6,959,259 B2 * | 10/2005 | Vock et al. | | 702/142 |
| 7,054,784 B2 * | 5/2006 | Flentov et al. | | 702/149 |
| 7,072,789 B2 * | 7/2006 | Vock et al. | | 702/141 |
| 7,092,846 B2 * | 8/2006 | Vock et al. | | 702/182 |
| 7,200,517 B2 * | 4/2007 | Darley et al. | | 702/160 |
| 8,239,146 B2 * | 8/2012 | Vock et al. | | 702/44 |
| 2003/0163287 A1 * | 8/2003 | Vock et al. | | 702/187 |
| 2006/0015287 A1 * | 1/2006 | Vock et al. | | 702/141 |
| 2006/0235642 A1 * | 10/2006 | Vock et al. | | 702/141 |

* cited by examiner

*Primary Examiner* — Carol S Tsai

(57) ABSTRACT

This invention allows for remote monitoring of the skier/skiing performance. The system consists of a various MEMS sensors embedded in skier clothing and equipment. These sensors measure instantaneous changes in acceleration in x/y/z axis and changes in earth magnetic field—relative to the skier position, to provide six degree of freedom in calculation of skier position as well as moments applied to the ski edge and forces experiences by the skier body. These sensors communicate with the monitoring application residing in the user wireless terminal (call phone) over the PAN wireless network. The instantaneous measurements are analyzed either locally or remotely and when the system is configured in an active mode, a corrective response to the MEMS actuators embedded in the ski or ski bindings may be send does changing the parameters of the run or provide enhanced safety.

9 Claims, 7 Drawing Sheets

WIRELESS SYSTEM FOR MONITORING AND ANALYSIS OF SKIING

PRIORITY INFORMATION

This application claims benefit of priority of U.S. provisional application Ser. No. 61/310,584 titled "Wireless System for Monitoring and Analysis of Skiing" filed Mar. 4, 2010, whose inventors are Stanislaw Czaja, Tadeusz Nanowski, Marcin Czaja and Ilona Stawski, which is hereby incorporated by reference in its entirety as though fully and completely set forth herein.

FIELD OF THE INVENTION

The present invention relates to the field of monitoring of skiing activities, and specifically to the monitoring of skier body position in relation to the skis and slope based on sampling of various MEMS (Micro-Electromechanical System) sensors and actuators embedded in the ski equipment and/or skier clothing then based on those data calculating moments applied to various parts of ski skier body then after analysis displaying the run. Furthermore, in a closed loop system, commands are sent to the actuators embedded in the ski equipment to provide corrective response to the instantaneous conditions of the ski equipment. Among other, such active response may consist of changing the tension (extend or shorten) of the ski edge to aid in edge handling, change the torque of a selected parts of the ski, dumping vibration of various parts of the ski, release ski bindings when moments applied to the skier leg exceeds safety limits.

DESCRIPTION OF THE RELATED ART

Currently monitoring of skier/skiing performance relies on few techniques, such as: skier feelings, instructor/coach observations, etc, and some empirical factors, such as: time measurements, post run video analysis, etc. All those methods are very subjective and unable to provide detailed information about moments applied to the ski edge or skier body as a function of skier position i.e. leg knee angles, position of hips, shoulders and arms in reference to slope, etc, nor provide any possibility for corrective action.

Some analytical methods for data collection during the development phase of the ski equipment are in use today, however, most of those techniques are not practical for the every day training of professional or recreational skier, as they require bulky equipment and require large team of highly skilled technicians to operate.

As the current monitoring systems are not practical for every day use, not only the analysis of the skier run is relegate to post run subjective interpretation, but more significantly the safety of the skier (performance of the ski bindings) is left virtually unchanged for the past thirty years, thus also the number of recreational skiers increased, their safety is not improved.

Furthermore, since the practical monitoring system does not exist, there is no possibility to actively improve skiing technique thus skiing experience for the average user.

In recent years, the use of mobile devices and, in particular, cellular telephones has proliferated. Today, cellular phone besides providing basic communication over cellular network is equipped with various input/output capabilities, such as wireless PAN (Personal Area Network), and provides significant computing resources. When such computing resources communicate with the remote sensors, such as MEMS accelerometers, magnetometers, gyroscopes, pressure sensors, actuators the resulting system can provide various sport analytical tools for monitoring of various sport activities, such as skiing.

SUMMARY OF THE INVENTION

This invention allows for the remote monitoring of the skier/skiing performance. The system consists of a various sensors embedded in the ski equipment or attached to the skier. These sensors measure instantaneous changes in acceleration in X/Y/Z axis and changes in earth magnetic field—relative to the skier position, to provide six degree of freedom in calculation of skier position as well as moments applied to the ski edge and forces experiences by the skier body.

In addition, such sensors may be augmented with the video capture, GPS supported ski slope mapping system, or radio telemetry or GPS synchronized CCTV systems installed along the ski slope, or barometric pressure capability. Such sensory system is integrated with wireless short-range communication device, such as Bluetooth, ZigBe, etc. under the control of the monitoring application residing in mobile terminal such as cellular phone, which in turn communicates over the Wireless Metropolitan Access Network (WMAN).

According to this invention the MEMS motion sensors such as: accelerometers, gyroscopes, magnetometers, barometric pressure and MEMS actuators are embedded in various locations essential for the measurement of skier performance, such as: skis, ski boots, cloth, poles, gloves, etc. Those sensors are sampled at an appropriate rate to provide real-time measurements of moments applied to the ski equipment and skier body.

When such sensors are equipped with the wireless communication link and monitoring application capable of analyzing such data, such system can provide real-time monitoring of skier performance. The results of such analysis can be transmitted over-the-air using mobile terminal wireless interface or can be stored in the mobile terminal memory, then downloaded into computer for further analysis.

When such system is equipped with the graphic rendering and capable of retrieving topological information from a radio-telemetry, GPS or GPS synchronized video from slope installed CCTV cameras, such system can display skier position in relation to the slope does allowing for the real-time analysis (by the coach) or post-run review by the user. Both the real-time and post-run analysis provide recording of all parameters of the run, such as edge forces, acceleration, etc, as well as rendering of skier position vs. slope. Furthermore, the graphical representation of the run can be interpolated between the samples to provide a visual representation of the entire run.

If such system is equipped with the MEMS actuators embedded in various position of the ski, ski binding, ski boot and the monitoring application is capable of providing a real-time feedback to such actuators such system may instantaneously compensate, or even correct skier errors.

Also skiing safety is very much related to skier skills, it is well understood that ultimate safety is proportional to many factors even beyond control of professional skiers. However, the only part of ski equipment dedicated to safety is fundamentally unchanged during almost half century relying on the spring tension. Besides arbitrary tension setting—to the skier weight and skills and not to dynamic condition during ski run, the binding spring operation is limited to one or two degree of freedom.

Most MEMS accelerometer sensors can provide measurements of moments in six-degree of freedom. Such accelerometer can be employed as a safety device dedicated to release ski binding and when the instantaneous moments experienced by the skier body exceeds dynamic parameters determined to be safe, by providing a real-time feedback from and actuator(s) to the ski binding. Such safety actuator can be integrated into ski binding or ski boot or skis and controlled in a real-time by the feedback mechanism provided by the monitor does providing an additional protection to the user.

In addition, such system may be equipped with bio-rhythmic monitoring sensors such as: heart rate, blood pressure, etc, to provide close-loop monitoring of the skier physical status.

The monitoring system described in this invention can operate using any of wireless technology such as: cdma2000 (1×RTT and EV-DO), UMTS, LTE, WiMax, etc.

BRIEF DESCRIPTION OF THE DRAWINGS

A better understanding of the present invention can be obtained when the following detailed description of the preferred embodiment is considered in conjunction with the following drawings, in which.

Figure 1:
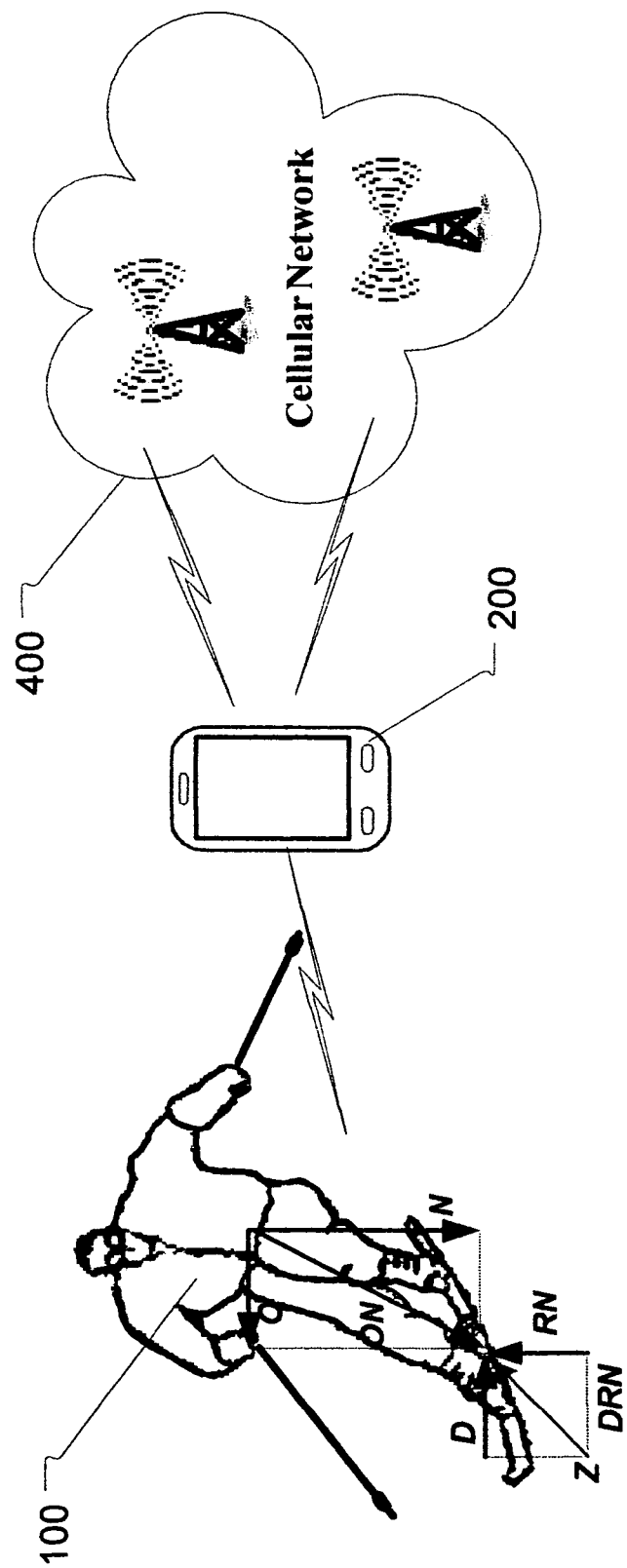
FIG. 1 is an exemplary ski monitoring system.

While the invention is susceptible to various modifications and alternative forms, specific embodiments thereof are shown by way of example in the drawings and are herein described in detail. It should be understood, however, that the drawings and detailed description therefore are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, etc.; or a non-volatile memory such as a magnetic media, e.g., a hard drive, or optical storage. The memory medium may comprise other types of memory as well, or combinations thereof. In addition, the memory medium may be located in a first processor in which the programs are executed, or may be located in a second different processor which connects to the first processor over a network, such as wireless PAN or WMAN network or the Internet. In the latter instance, the second processor may provide program instructions to the first processor for execution. The term "memory medium" may include two or more memory mediums which may reside in different locations, e.g., in different processors that are connected over a network.

Application—the term "application" is intended to have the full breadth of its ordinary meaning. The term "application" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Visual C, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including mobile terminal, personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Terminal—in the scope of this invention any wireless MAN enabled terminal such as cell-phone, etc.

User—in the context of this invention, person using the monitoring system.

Coach—in the context of this invention, any person authorized by the user to receive the data from the user monitoring system and provides analysis in real-time or off-line of the user performance.

Ski Equipment—in the context of this invention, any part of equipment used by the skier, such as: skis, ski boots, ski poles, ski clothing, ski glows, etc.

Passive Monitoring System—in the scope of this invention a system able to collect various instantaneous vectors such as, acceleration, angular orientation, geo-location and orientation, then using various angulation and mathematical operations calculate the forces applied to various areas of sport equipment or the user body to provide on-line or off-line analysis of the user performance.

Active Monitoring System—in the context of this invention a system able to collect various instantaneous vectors such as, acceleration, angular orientation, geo-location and orientation, then using various angulation and mathematical operations calculate the forces applied to various areas of sport equipment or the user body then send commands to actuators embedded in the sport equipment to provide corrective action.

Topological Information—in the context of this invention, information about the topology of the ski slop obtained through any combination of techniques such as: topography maps, GPS, Radio-Telemetry, barometric pressure monitoring, etc.

Description of Preferred Embodiment

The proposed method leverages on the properties of wireless Personal Area Network (PAN) such as Bluetooth and wireless wide area network, such as a cellular network, and combines the inherent benefits provided by those networks with the sensing technology such as: MEMS accelerometers, gyroscopes, magnetometers, actuators, embedded into skier equipment and an application software residing in the personal wireless terminal (for example user cell-phone).

In this invention sensor technology embedded in various places of the user ski equipment, provides instantaneous measurements of various moments applied to the skier body and his equipment to a mobile terminal based monitoring application over the PAN wireless interface. These measurements in addition to topological and location information (obtained from preloaded slope maps, GPS, Galileo, radio-telemetry, etc.), as well as user physical parameters, such as: weight, heights, distance from ankle to knee and hip, etc, and ski physical parameters, such as: total length, edge length and radius, etc. are used by the monitoring application to provide piece-wise analysis of the user run.

Since the ski edging is created by tipping (inclining) different parts of the skier body: feet/ankles, lover legs/knees, upper legs/hips and lower spine, then by placing sensors in various positions of ski equipment and skier body and then continuously recording the instantaneous changes of acceleration in x, y or z axis, one can reassemble the skier position during his run. Then with additional information about user physical characteristics (weight, heights distance from ankle to knee and hip, etc.), compute forces applied to the ski edge and experienced by the skier body.

Assuming moderate sampling rate of 1 kHz and 100 km/h speed, the exact skier position in regarding to the slope and ski as well as forces he applies to the ski edges and forces his body is experiencing, are calculated every 2.8 cm along the length of his run.

These piece-wise data are interpolated to provide continuous picture of the run and when superimposed over the graphical representation of the user, it provides realistic graphical representation of the run associated with the information obtained during the analysis.

Such graphical representation with corresponding moments may be reviewed in a real-time and transmitted to the coach wireless terminal, who in turn can feed back the advice to the user over the same wireless link or any other means of communication, or may be transmitted over such wireless network to the server for future off-line analysis, or may be stored locally within the monitoring application RAM.

Further improvements are possible when such monitoring/analysis system is augmented with the feedback mechanism providing commands to MEMS actuators placed inside the ski equipment. Such actuators can change the forces applied to the ski edge be extending or contraption of the ski edge length, provide vibration dumping mechanism or instantaneous release of the ski/ski boot connection when certain dynamic forces are present.

Figure 2:
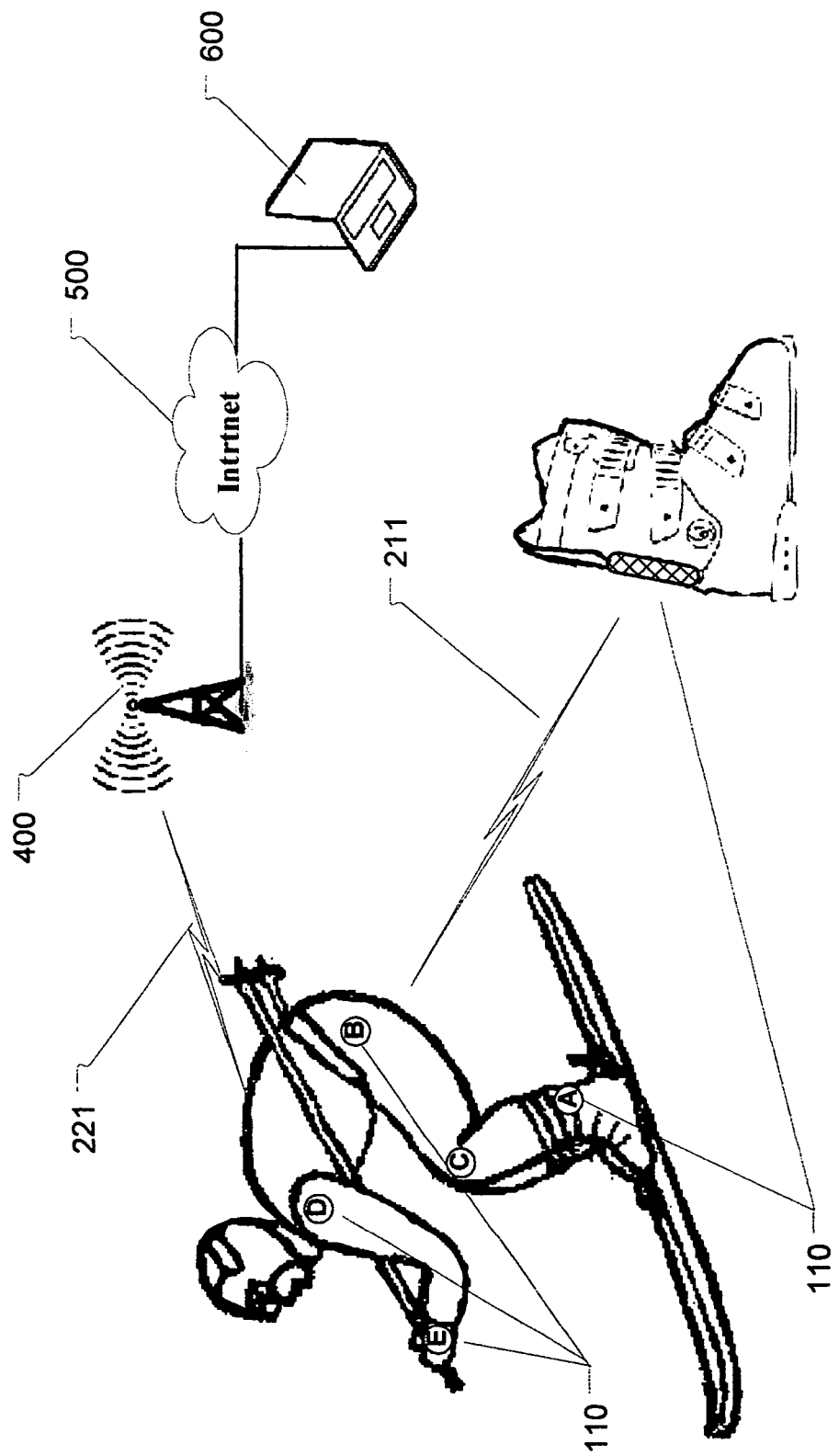
FIG. 2 depicts an exemplary location of the monitoring sensors and communication means.
Figure 3:
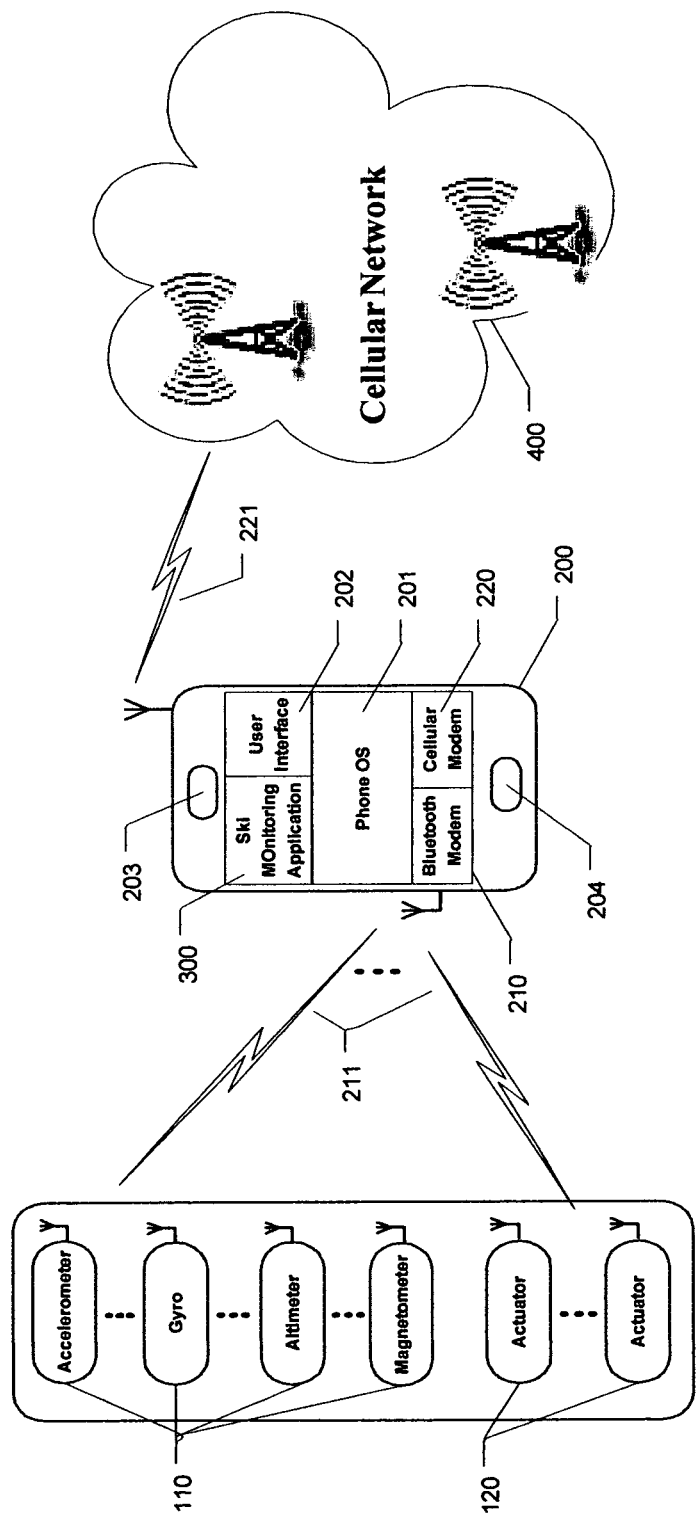
FIG. 3 presents an exemplary architecture of the monitoring system

An example of such system is presented in FIG. 1 and FIG. 2 and FIG. 3. Here, the monitoring application is embedded into the mobile terminal 200 and communicates with the monitoring subsystem 100 consisting of MEMS sensors 110 and MEMS actuators 120 using short range PAN wireless network 211. The mobile terminal 200 is connected to the analysis application 600 through the wireless MAN link 221 and/or Internet network 500.

Sensor 110 of FIG. 2 such as MEMS accelerometer, gyroscope, magnetometer, altitude-meter, etc. is embedded in various strategic places of the ski equipment and/or skier clothing. Those sensors measure predefined parameters such as accelerations in x/y/z axis, barometric pressure, changes in the earth magnetic field etc. Such measurements are sampled at the predefined for particular application and activity rate (i.e. 5 kHz for professional skier and 500 Hz for recreational skier), then transmitted to monitoring application 300 residing within the mobile terminal 200.

Figure 4:
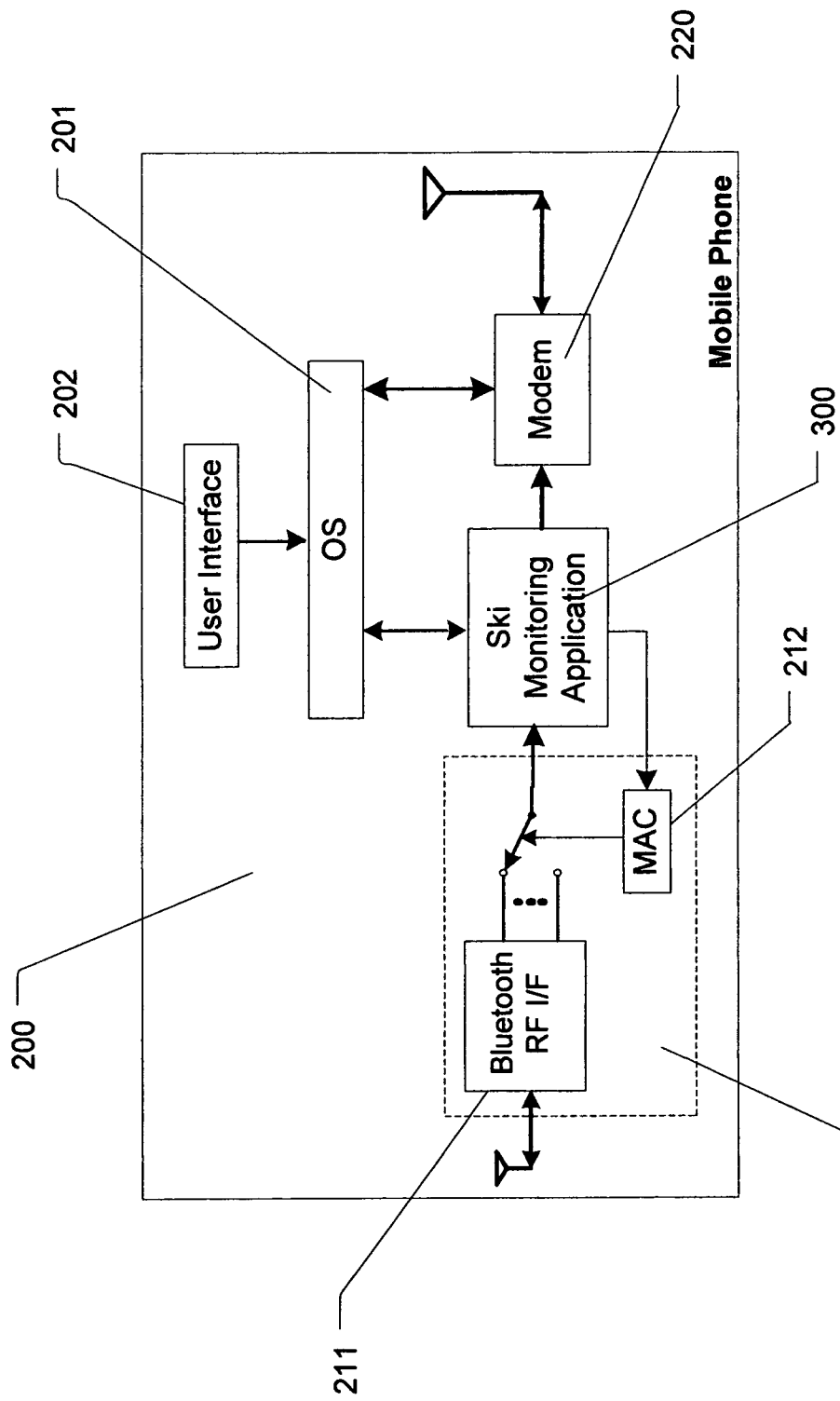
FIG. 4 presents the block diagram of the monitoring application residing within user mobile terminal

The exemplary monitoring application 300 of FIG. 4 resides within the wireless terminal 200 which consist of short range wireless interface 210, such a Bluetooth, communicating with the sensor/actuator sub-system over wireless link 211 a wireless modem 220 communicating with the MAN network over wireless link 221, a modem OS (Operating System) 201, and the user interface 202.

At the predefined sampling rate the monitoring application 300 sends command to the PAN Media Access Layer (MAC) 211 requesting current measurements. In response the MAC layer retrieves data from each sensor in sensor sub-system 100 through the RF interface 211, than transfers such data into the monitoring application memory.

Figure 5:
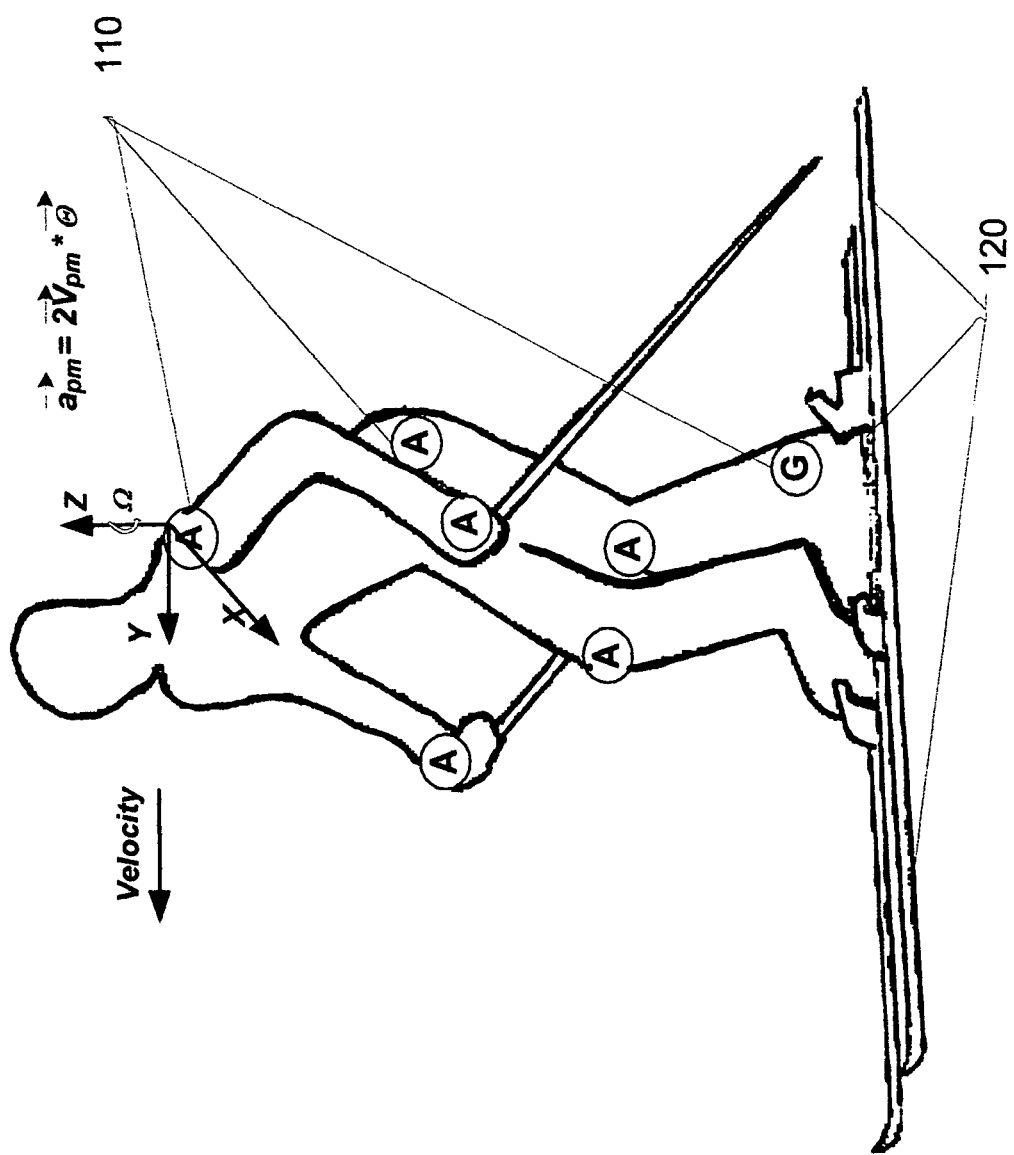
FIG. 5 depicts an example of vectors monitored by various sensors.

Various sensors such as accelerometers, gyroscopes, magnetometers of FIG. 5 are assembled in different configurations to provide measurements of instantaneous vectors in x/y/z axis with 3 or 6 degree of freedom does providing a snap-shot of skier movement.

Figure 6:
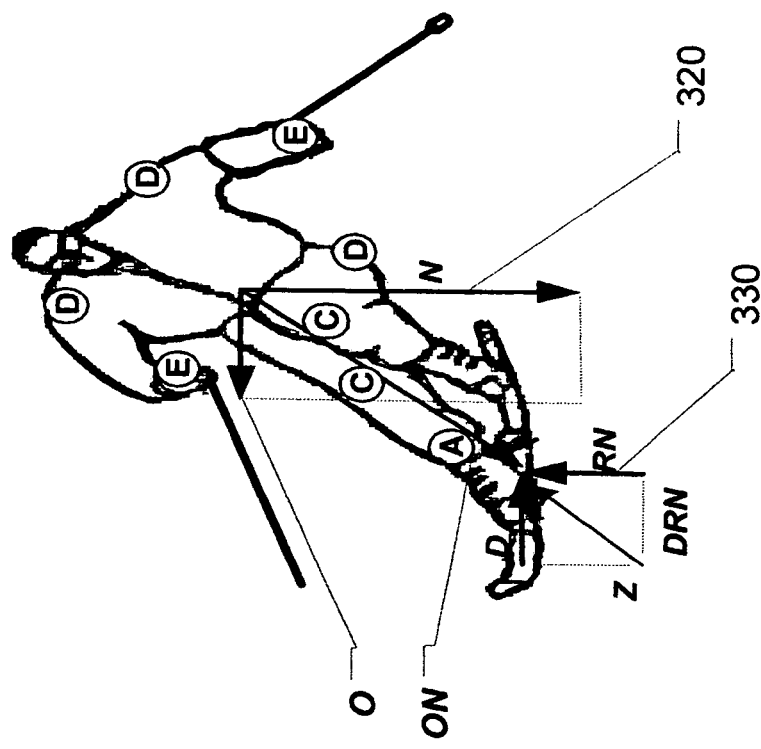
FIG. 6 presents an example of calculating forces applied to the ski edge by angulation using analyzing vector information collected by the sensors.
Figure 6:
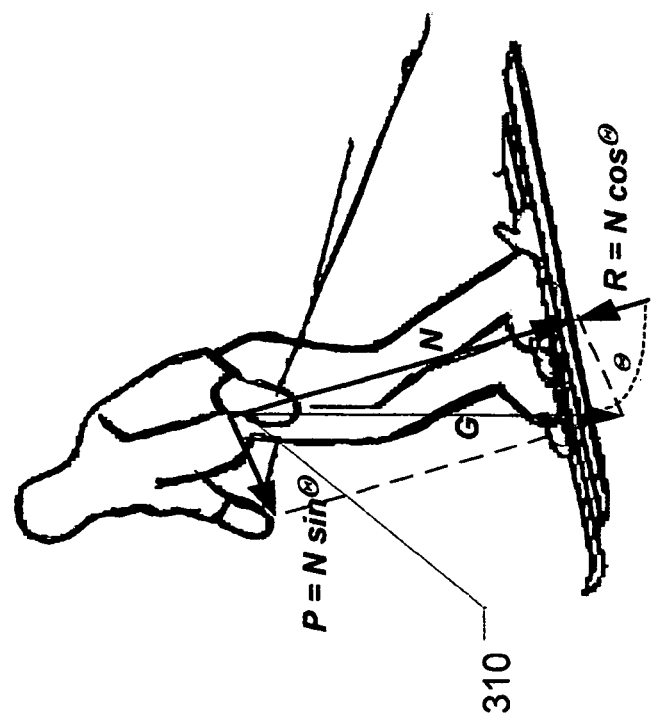

FIG. 6 depicts haw the stored vectors and user physical parameters such as: weight, height, ankle-hip distance, etc. are used to calculate the instantaneous forces experienced by the skier body, such as hip and knee displacements and associated forces 310 and 320, center of gravity, centrifugal force, etc. as well as the forces applied to the ski edge 320 using well know mathematical operations, such as angulation, among the others.

The result of these calculation are then superimposed on the graphical representation of the user physical parameters does providing virtual image of his/her position during this particular sampling instance.

Those piece-wise representations can be stored in the wireless terminal local memory and use later by the analysis application, or transmitted over the wireless MAN network directly to the analysis application 600 or over the Internet 500, if the analysis application is connected to such network.

The piece-wise representation is post-processed (interpolation, smoothing, rendering, etc), by the analysis application then the entire run is recreated in graphical form together with (or without) associated data.

Figure 7:
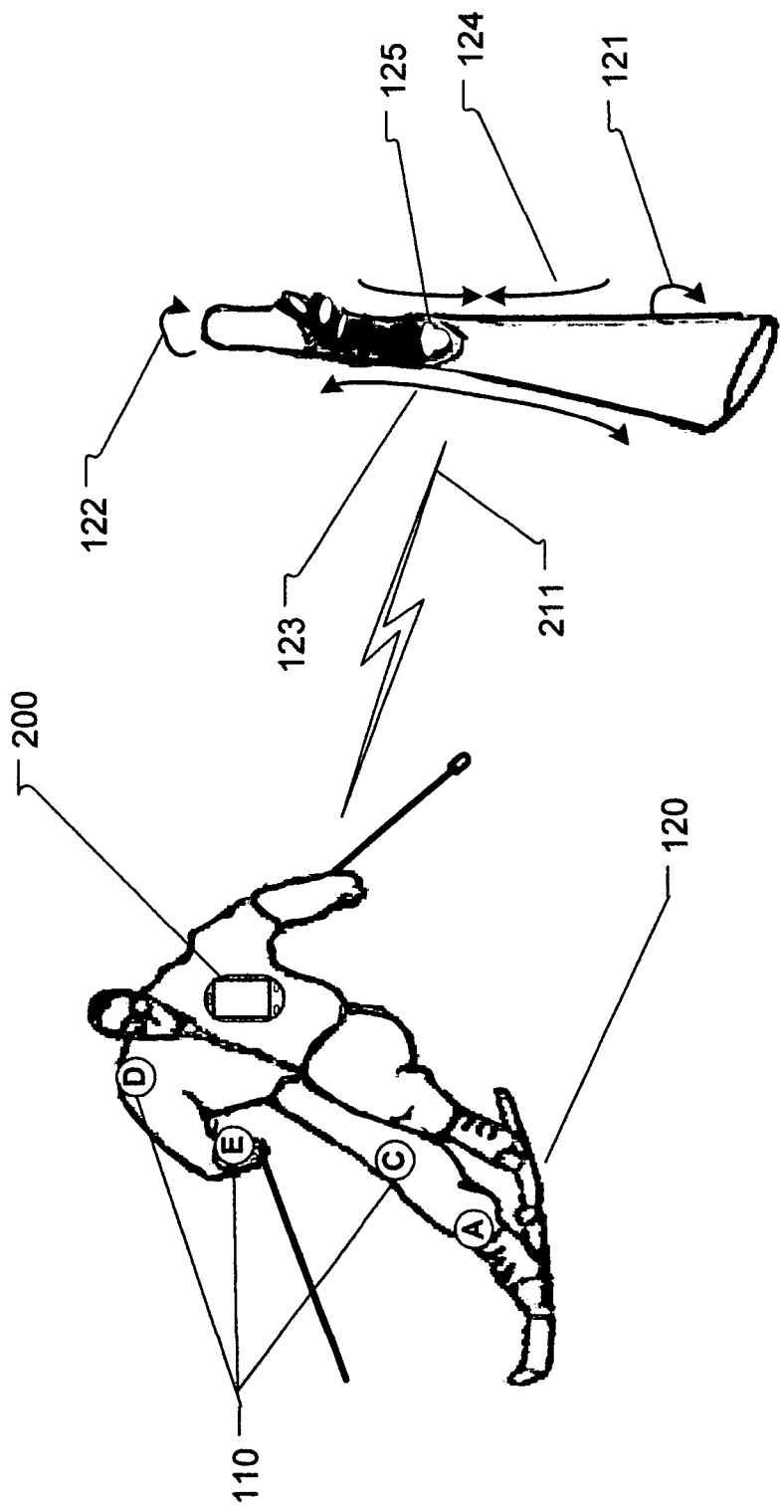
FIG. 7 presents an example how and active monitoring system may interact with the edge of the ski by calculating current skier position, moments then applying corrective forces to the ski edge.

When as in FIG. 7, the monitoring system operates in an active mode, parameters obtained in 310 and 320 are converted by the correction metric, then a corrective commands are send to the MEMS actuators 120 embedded in various places of the ski equipment. Those corrective commands may for example: change the torque of an particular part of the ski 121 and 122; or extend the outer (to the turn) edge of the ski 123, while contracting the inner (to the turn) edge of the ski 124, does improving the ski edge contact and turn performance or dampen excessive nose or tail vibrations; or release the ski binding 125 when the forces experienced by the ski/ski-boot interface exceed predefined safety limits.

The safety parameters of ski/ski-boot interface are calculated every sampling period based on user physical parameters and data from sensors, such as speed, moments applied to certain parts of the skier body, moments on the ski edges, relative (to each other and the slope) ski position, etc. When the instantaneous ski/ski-boot interface value exceeds the dynamic safety threshold for any of the skis a release command is sent to both ski bindings, does eliminating the danger of fall with one ski still attached to the skier leg.

To allow full analysis of the run, beside data received from various sensors, other information specific to the user and his equipment, and if applicable—topology of the run, must be provisioned.

The first such information 301 may contain user physical parameters, for example: user weight, height, ankle to knee distance, ankle to hip distance, hip to shoulder distance, length of the arm, etc. Such parameters are easy obtained by the user and may be entered among the other methods manually through the mobile terminal UI, or through imaging.

Additional parameters may include placement of the sensors, for example: ski, ski boot, ski binding, skier knee, hip, shoulder, elbow, glove, top of the ski poll, etc. as well as distance between some (or all) of them, for example: distance between ski boot and knee sensor, distance between knee and hip sensor, etc. Such information may be entered into the application manually through the UI or obtained automatically by other means, such as: radio ranging, differences in barometric pressure, etc.

The second such information 302 may contain physical characteristics of the ski equipment; such as but not limited to: total ski length and weight, length of the ski edge, turning radius, stiffness/elasticity of various parts of the ski (tip/tail/etc.), ski boots and bindings types and settings, etc. In addition, when the monitoring application operates in the active mode, the location and type and characteristics of MEMS actuators, for example: edge extension/contraction, vibration dumping, etc. tables are included. Such parameters may be obtained from the manufacturer supplied and encrypted data files. Such data files can be downloaded over the air during application provisioning.

The third such information 303 may contain the topological parameters of the ski run such as 3D map(s) or topological contours, etc. Such information can be either preloaded to the application from the ski resort website or downloaded over-the-air automatically when the user transfers from one slope to another.

The forth information 304 may contain indication if the topology mapping is supported by the GPS (enough visible satellites plus required accuracy), or radio telemetry system installed along the ski slope or time synchronized (GPS, Galileo, etc) slope CCTV cameras, or barometric pressure transmission capability or any combination of the above. Such information may be obtained automatically by the application when the user enters any specific area.

At each sampling period, vectors from the actuator sub-system 100, and the information 301, 302 and 304 are used by the monitoring application to calculate moments applied to various part of the user body as a moments 320 then construct graphical representation of the user superimposed over the slope topography using information 303 and/or information 304. This process is visually presented in FIG. 6, where only three vectors: N, ON and O, represents the user position (relative to the slope and turn radius), and his speed. From those vectors, one can calculate moments applied to ski edge RN and knowing the vector DRN (acceleration along the ski radius), calculate the "skid" along vector D. In a practical system, vectors from multiplicity of sensors (skis, knees, hips, shoulders, hands, etc.) are used to obtain the overall representation of the interaction between skier and the slope.

When the system is operating in the active mode as presented in FIG. 7, after the instantaneous vectors are analyzed a corrective metrics is calculated, then a corrective commands are sent to one or multiplicity of MEMS actuators 120 embedded in the ski or ski bindings over wireless link 211. Such command may change the stiffness of the certain part of the ski 121 and 122, or extend 123, or contract 124 ski edge to enhance ski grip during the turn, or damp temporary vibration of certain part of the ski, or trigger the release of the ski binding 125.

We claim:

1. A ski monitoring system comprising:
    at least one wireless port for providing bi-directional communication with one or more MEMS sensors or actuators, wherein the at least one wireless port is usable in providing wireless communication in a local area;
    a wireless port providing bi-directional communication with a cellular service provider network, wherein the service provider provides wireless communication in a macro area using a base station;
    a processor coupled to the at least one wireless port;
    a memory medium coupled to the processor, wherein the memory medium comprises executable program instructions to:
        at the specified intervals retrieve information from the sensor sub-system, and based on such information and the selected user information, and the ski equipment information, perform piece-wise calculation of velocity moments and reactive forces applied to the skis and skier body;
        provide corrective or emergency feedback to the actuators embedded in the ski equipment; and
        to construct graphical representation of the skier body during the run;
        store these piece-wise calculation in the mobile terminal memory or transmit them to the remote destination;
    a memory medium coupled to the processor, wherein the memory medium comprises storage of the system operational parameters:
    user information;
    the selected user ski equipment information;
    a ski slope topological information;
    type and location of sensors and actuators;
    IP addresses of the remote computer systems for downloading of the topological information and uploading measurement information; and
    a user interface to allow entry of the system operational parameters.

2. The method of claim 1, wherein said graphical reconstruction is performed within the mobile terminal.

3. The method of claim 1, wherein said graphical reconstruction is performed at the remote computer system.

4. The method of claim 1, wherein parameters corresponding to such selected user contains among the others: weight, height, distance from ankle to knee, distance from ankle to hip, distance from hip to shoulder, and length of the arm information.

5. The method of claim 1, wherein parameters corresponding to such selected user ski equipment contains among the others: length and weight of the ski, length of the ski edge, ski tip/center/tail width, ski turning radius, tip/center/tail stiffness, ski-binding height, and ski boot stiffness information.

6. The method of claim 1, wherein parameters corresponding to such ski slope topological contains information such as: 3-D maps, location and type of radio-telemetry sensors, presence, type and method of triggering of ski sloe vide equipment, etc.

7. The method of claim 1, wherein such piece-wise analysis comprises:
    sampling the outputs of sensors embedded in the sensor sub-system to obtain the acceleration vectors, including translational movement, then calculate changes in: velocity, tilt, rotation, torsion and vibration at each sensor location and use such measurements together with the selected user information to estimate, for each sensor location the reactionary forces due to such changes, then send such results to the predefined remote location for further analysis.

8. The method of claim 1, wherein such corrective action involves calculation of the inverse metrics of the velocity, tilt, rotation, torsion and vibration vectors to obtain a control signal to be send to the actuators embedded in the sensor sub-module.

9. The method of claim 7, wherein farther analysis of the received data includes superimposing of such data over the graphical representation of the skier, or over the time synchronized video of the run to provide visual feedback.

* * * * *